United States Patent [19]
Senegas et al.

[11] Patent Number: 5,716,585
[45] Date of Patent: Feb. 10, 1998

[54] PROCESS AND APPARATUS FOR STRIPPING FLUIDIZED SOLIDS AND USE THEREOF IN A FLUID CRACKING PROCESS

[75] Inventors: Marie-Andrée Senegas, St. Georges du Vievre; Thierry Patureaux, Fontaine la Mallet; Philippe Selem, Montivilliers; Jean-Louis Mauleon, Croix sur Aizier, all of France

[73] Assignee: Total Raffinage Distribution, S.A., Puteaux, France

[21] Appl. No.: 580,864

[22] Filed: Dec. 28, 1995

[30] Foreign Application Priority Data

Dec. 29, 1994 [FR] France .................................. 74 15856

[51] Int. Cl.$^6$ ..................................................... F27B 15/08
[52] U.S. Cl. ............................ 422/144; 422/145; 422/147
[58] Field of Search ........................................ 422/143, 144, 422/145, 147, 188, 189, 223, 312; 261/DIG. 72

[56] References Cited

U.S. PATENT DOCUMENTS

| | | |
|---|---|---|
| 2,472,502 | 6/1949 | Tyson . |
| 2,481,439 | 9/1949 | Ogozaly . |
| 2,490,079 | 12/1949 | Melvill ........................... 261/DIG. 72 |
| 2,491,536 | 12/1949 | Tyson . |
| 2,574,422 | 11/1951 | Stoos, Jr. et al. ........................ 222/517 |
| 2,576,906 | 11/1951 | Poupitch .................................. 151/37 |
| 4,331,533 | 5/1982 | Dean et al. ............................. 208/113 |
| 4,464,250 | 8/1984 | Myers et al. ............................ 208/120 |
| 4,687,639 | 8/1987 | Whiteside, II ......................... 422/112 |
| 4,698,212 | 10/1987 | Walters et al. ......................... 422/144 |
| 5,112,576 | 5/1992 | Kruse .................................... 422/144 |
| 5,171,544 | 12/1992 | Lang ..................................... 422/224 |
| 5,384,178 | 1/1995 | Rye ....................................... 428/182 |
| 5,441,793 | 8/1995 | Süess .................................... 428/192 |

OTHER PUBLICATIONS

Oil & Gas Journal, May 18, 1992, pp. 68–71.

*Primary Examiner*—Christopher Kim
*Attorney, Agent, or Firm*—Curtis, Morris & Safford, P.C.; A. Thomas S. Safford

[57] ABSTRACT

Process and apparatus for stripping fluidized solid particles countercurrently with a stripping fluid. This apparatus comprises at least one packing structure consisting of at least one element the flow cross-section of which is essentially transverse to the chamber axis, said element extending over the entire cross-section of the chamber in the circulation zone and consisting of cells or pathways through which pass the particles and the stripping fluid, said cells or pathways orienting the circulation of the fluid and of the particles to be stripped in approximately radial fashion.

24 Claims, 4 Drawing Sheets

5,716,585

PROCESS AND APPARATUS FOR STRIPPING FLUIDIZED SOLIDS AND USE THEREOF IN A FLUID CRACKING PROCESS

This application claims priority to French Application No. 94 15856, filed Dec. 29, 1994, incorporated herein by reference.

FIELD OF INVENTION

The present invention concerns the stripping of solid particles or grains in a fluidized bed. More particularly, the invention relates to a process and an apparatus for stripping solids by means of a fluid in a fluidized bed, particularly to remove hydrocarbon vapors entrained in the voids among the particles and adsorbed on said particles.

More particularly, the invention relates to techniques used in the petroleum industry. In particular, the invention relates to fluidized bed cracking processes whereby hydrocarbon molecules of high molecular weight and high boiling point are split into smaller molecules that have boiling points in a lower temperature range which is advantageous for the intended use.

BACKGROUND OF THE INVENTION

The references referred to hereinafter, each of which are hereby incorporated by reference, disclose the state of the art.

One of the processes most commonly used for cracking hydrocarbons is the fluidized catalytic cracking process (FCC). In this type of process the hydrocarbon feedstock is vaporized at high temperatures and at the same time placed in contact with the grains of the cracking catalyst maintained in suspension in the feedstock vapor and entrained thereby. After the cracking has produced the desired molecular weight range with a corresponding drop in boiling points, the products obtained are separated from the catalyst grains. The grains are subsequently stripped to recover the entrained hydrocarbons, regenerated by burning the coke formed thereon and recycled by once again being placed in contact with the feedstock to be cracked.

In this process, the desired decrease in boiling point of the hydrocarbons is brought about by controlled catalytic and thermal reactions. These reactions take place almost instantaneously when the finely atomized feedstock is brought in contact with the catalyst grains. In the short time during which the catalyst grains are in contact with the feedstock, however, the grains rapidly become deactivated essentially because of hydrocarbon adsorption and the deposition of coke and other contaminants onto the active sites of the catalyst grains. For this reason, it is necessary to (1) strip the deactivated catalyst grains continuously, for example with steam, to recover the hydrocarbons adsorbed and entrained in the voids, (2) separate the suspended catalyst grains, and (3) regenerate the grains, continuously and without altering their properties, by controlled combustion of the coke in a single-stage or multistage regeneration section before recycling the catalyst grains to the reaction zone.

Numerous types of apparatus and catalytic cracking processes are described in an article published in *Oil & Gas Journal*, May 18, 1992, pp 68–71, to which the reader is referred for additional details. The present invention also concerns other moving bed, circulating fluidized bed or bubbling bed apparatus and processes comprising a stripping apparatus, in addition to those involving catalytic cracking, such as the MTG process of the Mobil oil company and the DCC process of the Stone a Webster engineering company.

Stripping is one of the determining steps in fluid catalytic cracking. In fact, insufficient stripping causes the hydrocarbon vapors to remain on and in between the catalyst grains so that during the regeneration step an additional combustion load is imposed upon the regenerator with excessive heat production (beyond the heat needed to drive the catalytic reaction). As a result, the combustion of entrained hydrocarbon vapors in the regenerator represents a loss in final yield of converted product.

According to one of the usual techniques, in the case of an essentially upflow-type reactor column, the stripping takes place in a stripping chamber located at the upper end of the reactor column, after separation of the effluents coming from the reaction zone. In general, this stripping chamber is characterized by a high height to diameter ratio. It can have different shapes and constitute, for example, a reservoir of circular or hexagonal cross-section.

This chamber is typically divided into two zones. In the first zone, located in the upper part of the stripping chamber, a ballistic separation system of a type in itself known, described, for example, in U.S. Pat. Nos. 2,574,422 and 2,576,906. The ballistic separation system brings about the separation of the effluents from the catalyst grains and directs the catalyst grains downward, whereas the hydrocarbon vapors rise and, after supplemental separation of catalyst fines by a cyclone system, are conducted to a downstream fractionation zone. In the second zone, located in the lower part of the stripping chamber, stripping takes place in a descending dense fluidized phase. A gaseous fluid injected at the bottom of the chamber strips the suspension of deactivated catalyst grains. The stripping countercurrently brings about the displacement and the recovery of the hydrocarbons entrained in the voids among the grains of deactivated catalyst or adsorbed at their surfaces. Finally, the grains of stripped catalyst are discharged through an outlet located at the bottom of the chamber and are conducted to the regeneration zone.

For optimization of this stripping operation, it is known to use gaseous fluids which are preferably polar, such as steam, because they are more strongly adsorbed by the catalyst grains than are the hydrocarbons thus, by displacement, improving hydrocarbon desorption.

This stripping operation, however, is difficult. In particular, it is difficult to control the travel of the catalyst grains and to avoid partial defluidization linked with channeling (direct passage of large bubbles through the fluidized bed) and with back-mixing (downflow of poorly fluidized particles or even recirculation of such particles, especially in the region of the stripping chamber wall). Thus the range of, and average stripping time of, deactivated catalyst grains and the quality of contact between grains and gaseous fluid are difficult to control particularly in fluidized beds of large volume).

The stripping time is critical and must be limited in order to minimize side reactions, particularly excessive coking. The stripping time must be sufficient, however, so that the presence of combustibles does not adversely affect the regeneration reaction and increase the combustion load on the regenerator.

The quantity of coke present on the catalyst at the inlet to the regeneration zone and the regeneration mode largely determine the final temperature attained in the regeneration zone. This is because the calories stemming from the combustion of coke, minus the heat loss, serve to reheat the regeneration fluid (air and/or oxygen) while partitioning themselves between the combustion gas and the catalyst particles. Under steady-state conditions, the quantity of coke produced in the cracking unit will thus be approximately constant if the heat equilibrium is not modified by external constraints.

This quantity of coke is linked to the difference ("Δ coke") between the quantity of coke present on the regenerated catalyst at the inlet to the regeneration zone and that present at the outlet from said zone.

If Δ coke, and thus also the regenerated catalyst temperature, increase; it is necessary to reduce the flow rate of the circulating catalyst grains to keep the reaction temperature within acceptable limits. Moreover, an increase in Δ coke corresponds to a higher catalyst grain regeneration temperature. Thus the control of Δ coke in a modern cracking unit run by the FCC process in which the regeneration temperature is not limited appears to be one of the fundamental variables of the process.

Currently, with the operating conditions of the FCC process becoming more and more severe, corresponding to the use of heavier and heavier feedstocks and, hence, feedstocks of high boiling points, increasing amounts of coke deposits are found on the catalyst grains. To a certain degree, this could be useful, because it would produce a higher temperature at the inlet to the reaction zone which would bring about more complete feedstock vaporization, controlled thermal cracking of the asphaltenes and a higher energy input by the catalyst. It is desirable, however, to be able to control and to limit the catalyst grain regeneration temperature so as to preserve catalyst heat stability and reduce the adverse effect of certain constituents present in the feedstock, particularly in the most heat-resistant residues. Moreover, it is sometimes desirable to increase the weight ratio of catalyst C to feedstock O ("C/O ratio") with which it is in contact at the inlet to the reactor column so as to improve the contact between the feedstock and the catalyst grains, and to increase feedstock conversion by exposing the feedstock to a greater number of active sites of the catalyst grains.

Different techniques have been proposed in the past to improve stripping. In particular, the following patents illustrate the envisaged approaches to improved stripping.

U.S. Pat. No. 2,472,502 describes a stripping apparatus comprising a zone of grating sections separated from each other in the stripping zone and disposed transverse to the axis of the reactor chamber. Said grating sections limit the undesirable circulation of solid particles. The patentees indicate that the percentage of unstripped solid particles descending directly into the regeneration zone is limited by this apparatus. The patentees also add that, at the same time, the ability of the solid particles to recycle upward is also reduced.

U.S. Pat. No. 2,481,439 describes a stripping apparatus comprising a zone of grating sections spaced with respect to each other. The grating sections comprise cells and are spaced so as to prevent the formation of channels in the descending stream of solid particles through which the stripping gas can flow. The grating sections occupy a major part of the length of the stripping zone whereas the spaces between the grating sections form a minor part of said stripping zone. These spaces serve to redistribute the solid particles and the stripping gas, which results in the formation of a turbulent, dense fluidized mixture. Moreover, the cells of the grating section subdivide the gas stream into a plurality of small streams. Thus, according to the patentees, during passage through the cells defined by the grating sections, the solid particles come into intimate contact with said subdivisions of the gas stream.

U.S. Pat. No. 2,491,536 describes a stripping apparatus of approximately the same design as that disclosed in U.S. Pat. No. 2,472,502. The lowest part of the stripping zone where the stripping gas is introduced is divided into cells, and the grating sections are disposed only in the remaining part of the stripping zone. The space between the grating sections serves to redistribute the solid particles in the stripping gas and to prevent said gas from flowing into a conduit formed by the smallest cells of the grating sections.

The systems presented in the above-cited patents resolve the problems associated with stripping only partly. Moreover, the described means are not suitable for technological development and new applications, particularly under the more and more severe operating conditions used in FCC units.

SUMMARY OF THE INVENTION

The present invention obtains improved results and resolves the problems associated with the prior art by providing a novel apparatus and a novel process for improving the stripping of fluidized solid particles.

Said novel apparatus for the countercurrent stripping with gaseous fluid comprises:

- an approximately vertical stripping chamber;
- at least one conduit with its top ending in the chamber and used to introduce the particles to be stripped;
- at least one conduit connected to the bottom of the chamber, for discharging the stripped particles;
- at least one line for discharging the cracked feedstock;
- at least one line for feeding the gaseous stripping fluid, said line ending at the bottom of the chamber;
- a zone of downward circulation of the suspended particles to be stripped countercurrently by the fluid inside the chamber;
- and is characterized by the fact that it contains at least one packing, comprising at least one element whose flow cross-section is essentially transverse to the chamber axis, said element extending over the entire cross-section of the chamber in the circulation zone and consisting of cells or pathways through which pass the particles and the stripping fluid, said cells or pathways orienting approximately radially the circulation of the fluid and of the particles to be stripped. Preferably, the cells or pathways are oriented to cause the individual components of particle and/or fluid flow to diverge in a plurality of directions.

The radial orientation improves the dispersion and the homogenization of the particles by the stripping fluid. In particular, after passing through the packing element, the particles are redistributed in space which ensures a state of organized perturbation with the fluid and promotes random contacts. The fluid and the particles are directed in a plurality of directions from a single flow. Moreover, the packing element prevents the back-mixing and channeling of the particles and the formation of solid or gaseous pockets.

The use of the packing element also makes it possible to reduce the dimensions of the zone of contact between the solid particles and the fluid. In fact, because this contact is clearly improved, it is possible to use smaller stripping chambers compared to those of the prior art, without a loss in stripping performance. This can be explained, in part, by the action of the divisions and recombinations generated by the cell walls of the packing element which subdivide the injected fluid into fine bubbles of identical size and cause uniform repartition of the bubbles inside and outside said element thus bringing about better contact with the particles.

The invention also has as a further embodiment the stripping process associated with this novel stripping apparatus. The process for stripping fluidized solid particles countercurrently with a stripping fluid comprises the following steps:

introducing the particles to be stripped at the top of an approximately vertical chamber;

introducing the stripping fluid at the bottom of the chamber;

causing the suspended particles to circulate downward through the circulation zone of the chamber countercurrently to said fluid, and is characterized by the fact that the particles and the fluid are made to circulate countercurrently through at least one packing consisting of at least one element whose flow cross-section is transverse to the chamber axis, said element being disposed a across the entire cross-section of the chamber in the circulation zone and consisting of cells causing radial orientation of the fluid and the particles.

The apparatus and the process according to the invention make it possible to recover in the most advantageous manner the fluidized solids entrained in the interparticle and intraparticle voids of the suspension of particles in the countercurrently flowing fluid.

In the case of an FCC units the particles are deactivated catalyst grains. The intimate contact of the grains with the fluid which is generated by the radial orientation brings about improved desorption of the fluidized hydrocarbons present at the surface and in the pores of the particles. Moreover, the radial orientation of the gaseous fluid brings about improved recovery of the hydrocarbons entrained in the space among the grains. Thus the $\Delta$ coke is reduced and the C/O ratio is increased, which contributes to greater flexibility in achieving thermal and reaction equilibrium of the unit.

According to another preferred embodiment of the invention, the particles and the countercurrently flowing fluid are deviated in two different directions as they are leaving the packing elements. Approximately 50% of the gaseous fluid and approximately 50% of the particles is deviated in a first direction and approximately 50% of the gaseous fluid and approximately 50% of the particles is deviated in a second direction which forms with the first direction an angle of 10 to 90 degrees. These deviations and said radial orientation are induced by the geometry of the cells or pathways forming the packing element. The cells or pathways can assume many shapes. The "cells" refer to the crossings (or converging points) of two "valleys" of two contiguous corrugated sheets, for example. Preferably, the cells or pathways are elongated.

For example, these cells or pathways can be formed by an assembly of corrugated metal sheets cut across their plane. These corrugated metal sheets can be perforated, grooved or rough and preferably are assembled so that the corrugated edge of each sheet forms an angle of approximately 45 to 135 degrees with the corrugated edge of the adjacent sheet. According to a particularly preferred embodiment, said angle is a 90-degree angle, thus defining a network of channels crossing at right angles. Advantageously, these crossings permit direct contact between the fluid and the particles inside the packing. The crossed channels of the network may have a uniform opening.

The disposition of the sheets facilitates the deviation of the particles and of the fluid within the elements. In particular, in the embodiment of the invention described hereinabove, 50% of the particles and of the gaseous fluid is deviated at each intersection formed by the edges of the corrugations of a first sheet with the edges of the corrugations of a second, adjacent sheet, the direction of said deviations being approximately 10 to 90 degrees relative to the initial direction. These intersections constitute the preferential zones of contact between the particles and the stripping fluid.

Various packing element structures employed in other applications may be used to practice the invention. In particular, the static mixers sold by the Sulzer-SMV or Kenics companies, although not meant for this application, can be adapted and modified to constitute a packing element according to the present invention.

Depending on its type, the stripping chamber comprises one or several packing elements. In one preferred embodiment of the invention, the stripping chamber comprises at least two packing elements. In a particularly preferred embodiment of the invention illustrated by the drawings and examples described hereinbelow, the chamber contains three packing elements. In certain cases, particularly when used in an FCC unit, the packing elements are spaced so as to facilitate the redistribution of the particles in the fluid and to permit the passage of debris, particularly coke. Advantageously, the packing elements can occupy (cumulatively) 20 to 80% of the internal volume of the stripping chamber.

If the stripper contains more than one packing element, these elements are preferably positioned inside the stripper in a manner such that the plane of the directions of the catalyst grains and of the fluid, after they have passed through a first element, forms an angle of approximately 90 degrees with the plane of the directions of the catalyst grains and of the fluid after they have passed through a second element.

Depending on the shape of the cells or pathways described in the foregoing, the plane of the corrugated sheets of a first element will preferably be preferentially oriented so as to form an angle of approximately 45 to 90 degrees with the plane of the corrugated sheets of the second, neighboring element. In this manner, the direction of the catalyst grains and of the fluid is modified not only inside the elements but also as they enter and exit each packing element.

The total cumulative thickness E of the packing element or elements is selected as a function of the height H of the stripping zone where the contact between the particles and the fluid takes place. In general, this thickness E represents preferably from 10 to 80% of the height H of the stripping zone.

Moreover, for each packing element, the cell volume represents from 50 to 98% and preferably from 90 to 98% of the total volume of this element, which promotes good circulation of the particles and of the stripping gas without reducing their state of turbulence.

The attached drawings show schematically a stripping apparatus using one embodiment of the invention, particularly in fluid catalytic cracking.

BRIEF DESCRIPTION OF THE DRAWINGS

In this specification and in the accompanying drawings, we have shown and described preferred embodiments of the invention and have suggested various alternatives and modifications thereof; but it is to be understood that these are not intended to be exhaustive and that many other changes and modifications can be made within the scope of the invention. The suggestions herein are selected and included for purposes of illustration in order that others skilled in the art will more fully understand the invention and the principles thereof and will thus be enabled to modify it in a variety of forms, each as may be best suited to the conditions of a particular use.

In the drawings.

DETAILED DESCRIPTION

Figure 1:
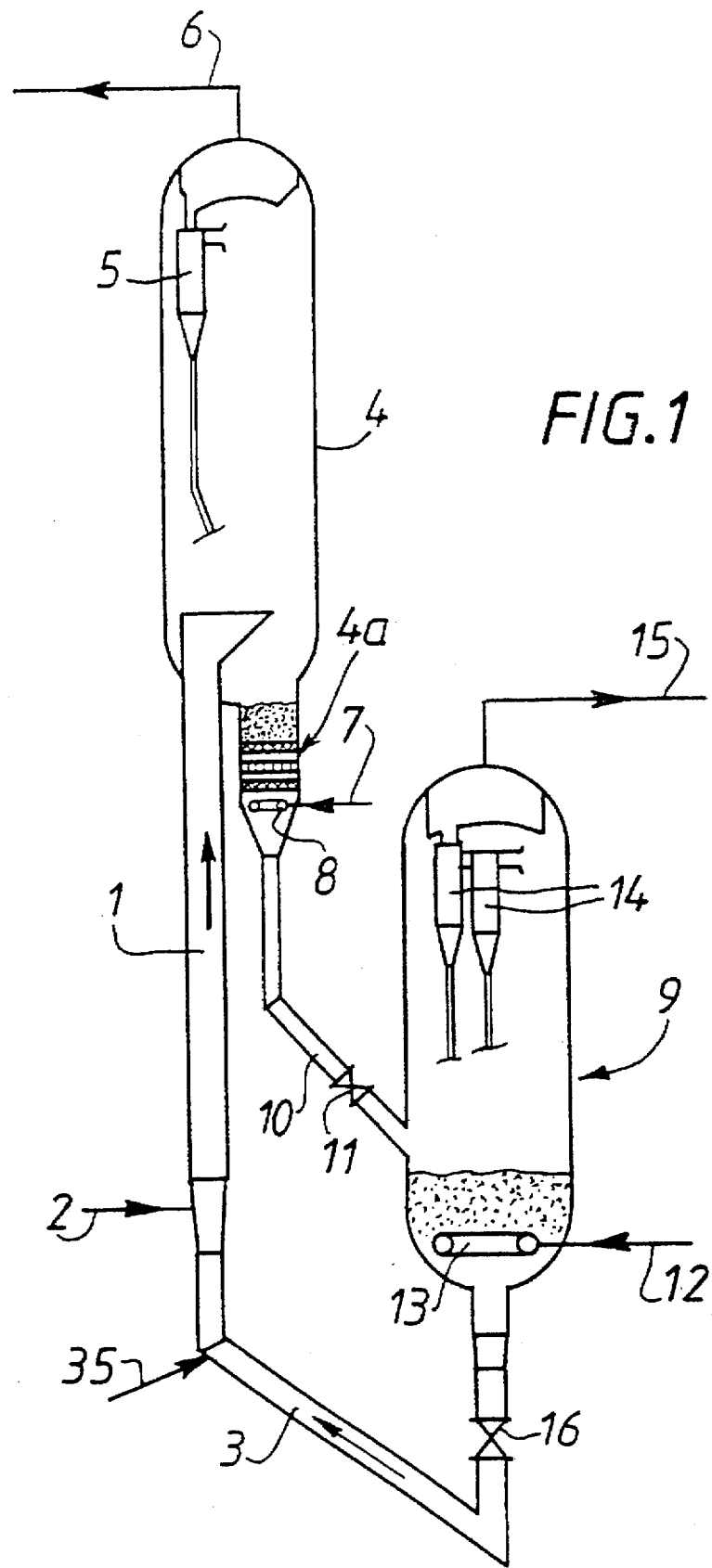
FIG. 1 is a schematic side elevational view depicting a conventional FCC cracking apparatus (illustrating the positioning of the packing elements of one preferred embodiment of the present invention)

Reference will now first be made to FIG. 1, wherein a typical apparatus for catalytic cracking by the FCC process is represented schematically including three packing elements according to one preferred embodiment of the present invention. Essentially, it comprises an external column 1, called the riser, to which the feedstock to be treated is fed from the bottom through line 2 and the particles of a cracking catalyst are fed through conduit 3. A lift gas, for example steam, is introduced into column 1 through line 35.

External column 1 is connected at its top to a chamber 4 wherein the separation of the cracked feedstock and the stripping of the deactivated catalyst particles take place.

In the present case shown in the figure, stripper 4a is eccentric relative to the column 1. The stripper, however, can assume other shapes and positions. For example, the stripper can be concentric with the column 1, which requires an adaptation of the element design.

The treated feedstock is separated in a cyclone 5 located in chamber 4 at the top of which is provided a discharge line 6 for the cracked feedstock, whereas the deactivated particles move by gravity toward the bottom 4a of chamber 4. A line 7 feeds the stripping fluid, generally steam, to the fluidization gas injectors or diffusers 8 regularly disposed at the bottom 4a of chamber 4. The stripping thus takes place preferentially in dense medium, with steam flowing countercurrently to the particles.

The deactivated catalyst particles thus stripped are discharged from the bottom of chamber 4 to regenerator 9 through conduit 10 on which is provided a control valve 11. In regenerator 9, the coke deposited on the catalyst particles is burned off with air injected at the bottom of the regenerator through line 12 which feeds the regularly spaced injectors 13. The particles of the treated catalyst entrained by the combustion gas are separated in cyclones 14 from which the combustion gas is discharged through line 15, whereas the catalyst particles are rejected downward to the base of regenerator 9 from where they are recycled to the feed to riser 1 through conduit 3 which is provided with control valve 16.

The dimensional and operational characteristics of such an apparatus are typically as follows:

height of the reaction part of riser 1: 5 to 40 meters, temperature of the feedstock to be cracked: 75° to 450° C., feed rate of feedstock to be treated to riser 1: 1000 to 20,000 metric tons per day, feed rate of catalyst to riser 1: 3 to 50 metric tons per minute, cracking temperature in the riser: 500° to 600° C., residence time of the feedstock in the riser: b 0.1to 10 seconds, catalyst regeneration temperature: 650° to 900° C.

residence time of the catalyst in regenerator 9:5 to 20 minutes.

Figure 2:
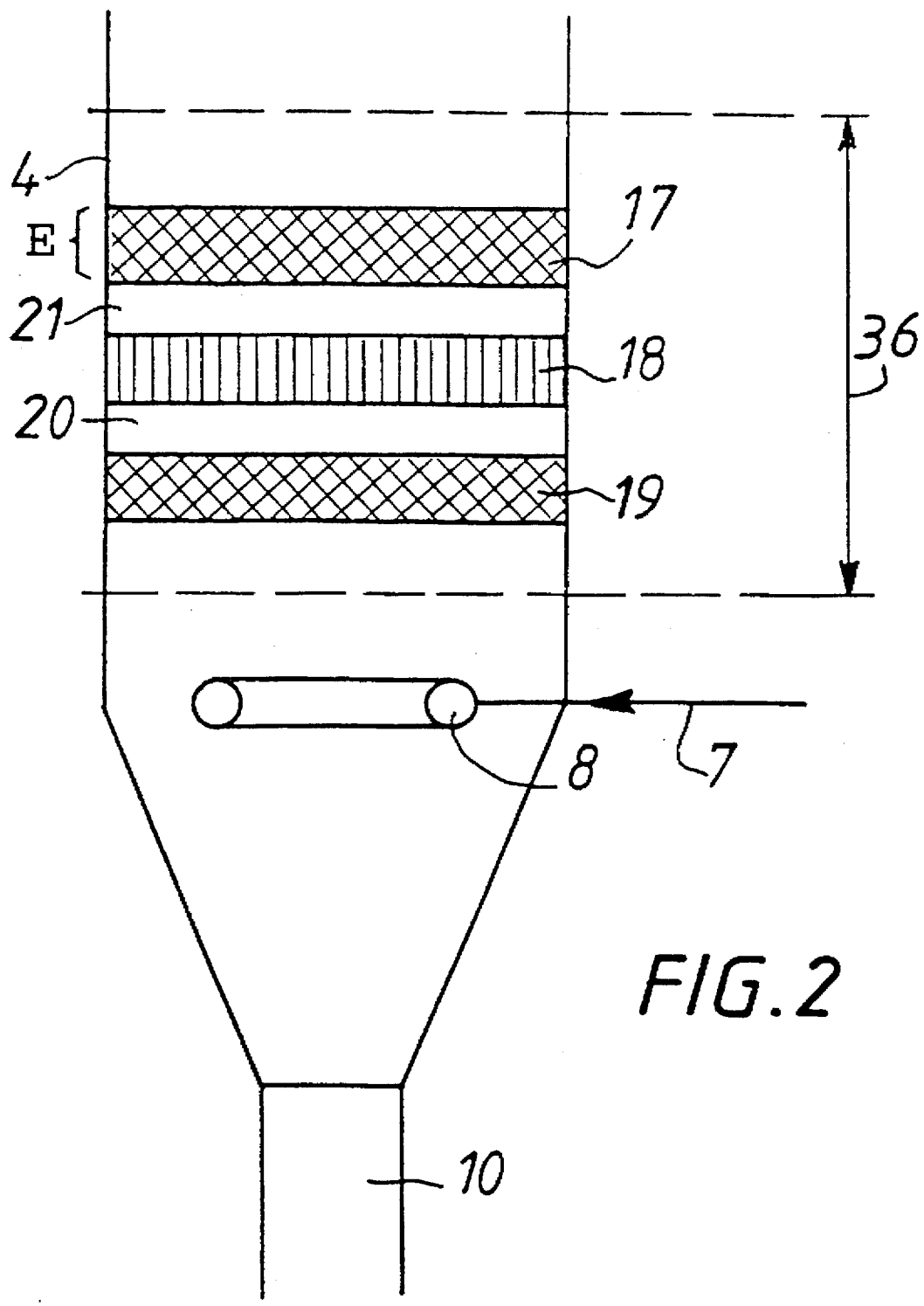
FIG. 2 is an enlarged detailed schematic vertical section depicting a preferred embodiment of the invention adapted to the stripper of an FCC unit.

Turning now to FIG. 2 which schematically represents a stripper that comprises an arrangement according to a preferred embodiment of the invention. Three packing elements 17, 18 and 19, have been added to the stripper in countercurrent circulation zone 36 (height H of the stripping zone) for the suspended catalyst particles and the gaseous stripping fluid.

These three elements, 17, 18 and 19, are disposed approximately perpendicularly to the axis of stripping chamber 4 and are approximately parallel to each other. The elements are located above injectors 8 that distribute the stripping fluid and are fastened to the walls of chamber 4 by conventional, known means which results in the elements being immobilized during stripping.

In this embodiment, packing elements 17, 18 and 19 are separated by spaces 20, 21 which serve to prevent problems of plugging and accumulation of debris, particularly coke, between the packing elements. In these spaces 20, 21, stripping is considerably improved as a result of the radial component of gas and particle flow and because of a more uniform particle/gas ratio through the stripping chamber. In fact, said spaces 20, 21 enable any debris oriented radially to pass from one packing element to another. Moreover, said spaces 20, 21 bring about redistribution of particles and fluid by forming a turbulent, dense fluidized mixture between the packing elements.

The packing elements may comprise corrugated metal sheets assembled and cut across their corrugation plane. Each packing element is preferably positioned inside the stripper in a manner such that the corrugation plane of the corrugated sheets of a first element is oriented at an approximately 90-degree angle to the corrugation plane of the corrugated sheets of the neighboring element. Thus, the direction of circulation of the catalyst grains and of the fluid, after they have passed through a first element, forms an approximately 90-degree angle with the direction of circulation of the catalyst grains and of the fluid in a second element, after they have passed through the second element, which facilitates redistribution of catalyst particles outside the packing elements and the formation of an organized state of perturbation with the fluid.

Figure 3:
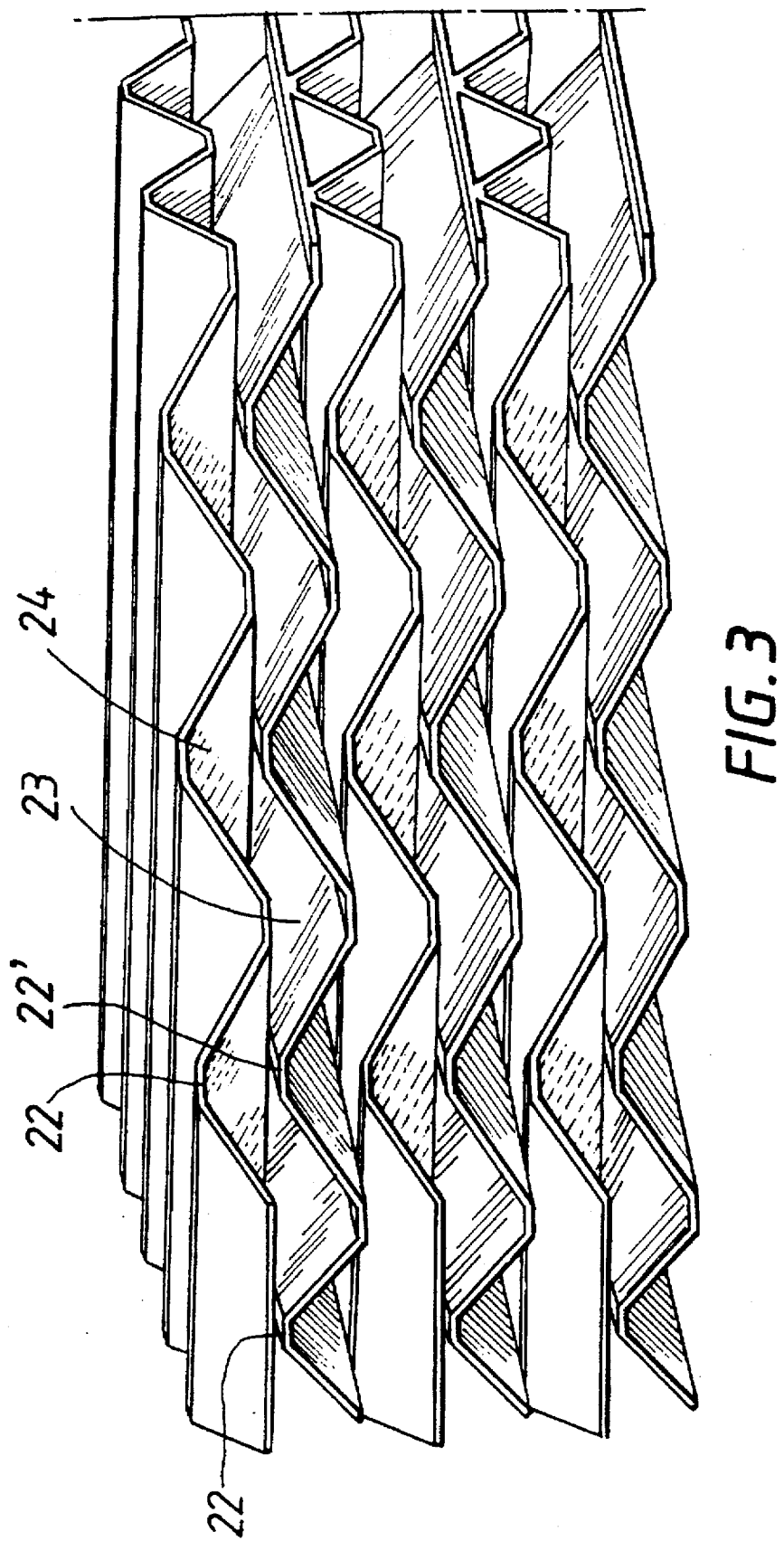
FIG. 3 is a top (plan) view of a section of one type of packing structure effective in the preferred embodiment of FIGS. 1 and 2.

FIG. 3 represents a partial top view of a section of a packing element according to one embodiment of the invention.

The packing element consists of corrugated sheets cut across their corrugation plane. These corrugated sheets are assembled so that the edge of corrugation 22 of each sheet forms an angle of about 90 degrees with the edge of corrugation 22' of the adjacent sheet. Thus the corrugations of each sheet intersect each corrugation of the adjacent sheet and constitute cells or pathways forming a network of crossed cells or pathways 23, 24. These crossings or intersections are zones of preferential contact between the particles and the fluid.

During passage through said channels 23, 24, the particles and the countercurrently flowing fluid are maintained in a state of dense fluidity. The cross-section of the cells or pathways is such as to prevent any obstruction of the particles within the packing element.

In one preferred embodiment, the corrugated sheets are welded to each other at the edge of corrugations 22, 22'. The catalyst particles penetrate and are guided in channels 23, 24. The arrangement of these channels is such that the particles deviate at each intersection formed by the corrugations of a first sheet with the corrugations of a second, adjacent sheet thus improving the divisions and recombinations of said particles and of the countercurrently flowing stripping fluid.

Figure 4:
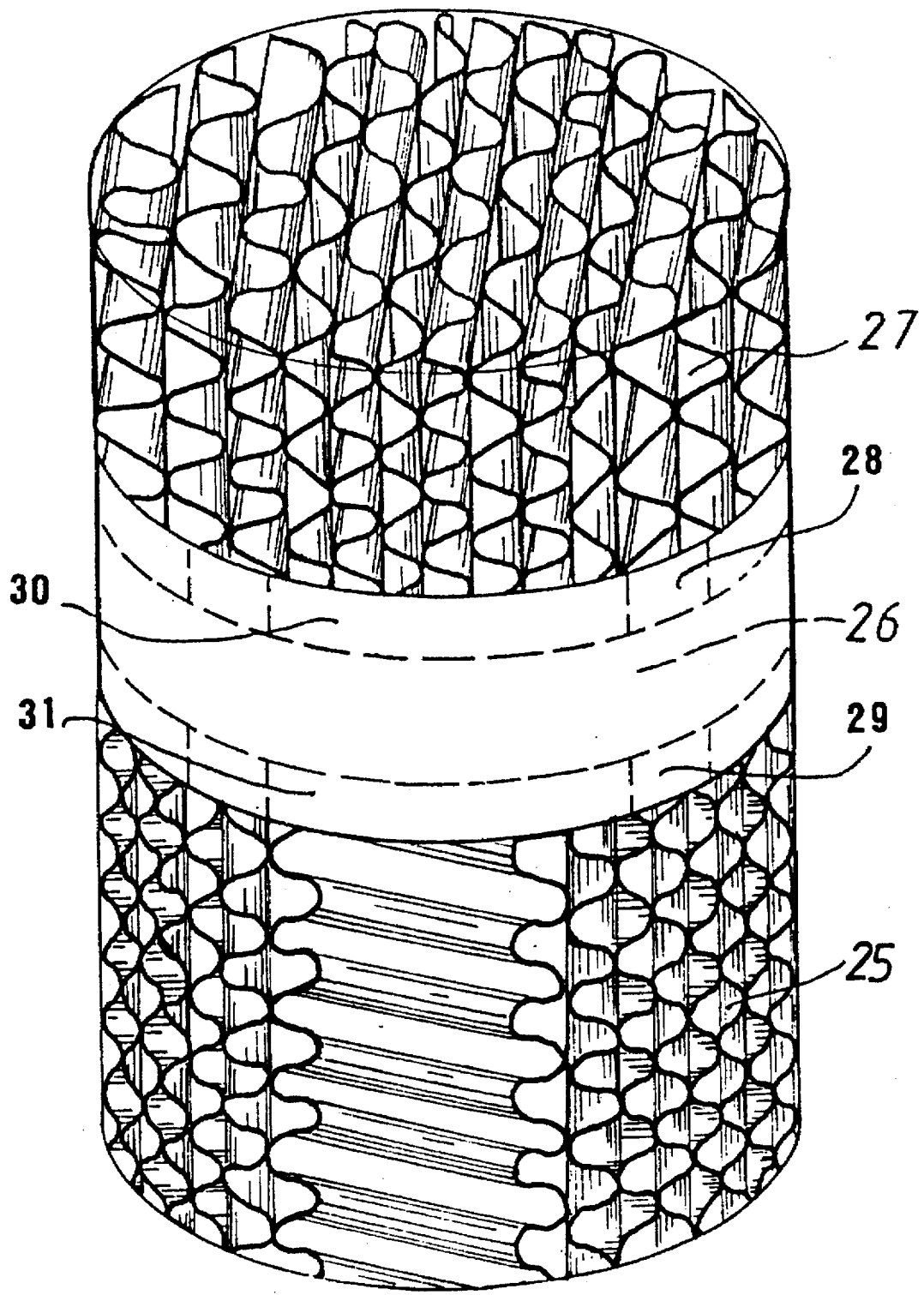
FIG. 4 is a perspective view of a packing structure according to a preferred embodiment of the present invention.

Finally, FIG. 4 illustrates a general perspective view of a packing comprising three elements, 25, 26 and 27 according to another embodiment of the invention. The elements are separated by spacing-ties 28, 29 to facilitate redistribution of the particles and of the fluid in spaces 30, 31. The stripping fluid circulates through the elements from bottom to top and the particles from top to bottom without back-mixing and channeling occurring.

The invention may be further illustrated by the following non-limiting examples, many apparent variations of which are possible without departing from the spirit thereof.

EXAMPLES

The tests presented hereinbelow were carried out under similar conditions and are intended to illustrate the invention and to stress certain advantages of the apparatus and stripping process of the present invention.

These representative tests were carried out to reproduce the process according to the invention in a stripping chamber of a catalytic cracking unit using an entrained, fluidized bed. The results of these tests have been compared with the performance of an arrangement of baffles in the stripping zone.

The tests were carried out in a commercial unit at a pressure of about $2 \times 10^5$ pascals. The stripping rate was kept at a high level of 2.8 metric tons of stripping steam per hour, corresponding to a rate of void stripping of 260%. The treated feedstock was a mixture of VGO (vacuum gas oil) and reduced North Sea crude (40/60 ratio), and the unit was run at 520° C.

|  | Test No. 1 With gratings | Test No. 2 With packing | Test No. 3 With packing |
| --- | --- | --- | --- |
| Stripping steam, metric tons/h | 2.8 | 2.8 | 1.6 |
| Regenerator temperature, °C. | 743 | 695 | 711 |
| C/O Ratio | 4.8 | 6.4 | 5.8 |
| ΔCoke, wt % | 0.97 | 0.75 | 0.82 |
| Coke hydrogen, wt % | 7.8 | 6.0 | 6.6 |
| Afterburning, °C. | +15 | −3 | +2 |
| Addition of fresh catalyst particles, met. tons/day | 5.0 | 3.0 | 3.5 |

In test No. 1, the stripping chamber contained stripping zone baffles of conventional design and of performance similar to that of the gratings described in U.S. Pat. No. 2,472,502. In test No. 2, the stripping chamber contained in the stripping zone three stripping elements spaced according to the illustrated preferred embodiment of the present invention.

A marked decrease in regeneration temperature and afterburning temperature can be noted in the unit of the present invention. The coke hydrogen and the Δ coke percentage were also reduced thus confirming good contact and stripping efficacy in the stripping zone and, hence, very good recovery of hydrocarbons from the surface of and from the space among the catalyst particles.

The stripping efficacy makes it possible to increase the C/O ratio (weight ratio of catalyst C to feedstock O with which it is in contact within the apparatus) and thus to increase feedstock conversion by exposing the feedstock to a larger number of active sites on the catalyst particles.

Moreover, the stability of the catalyst particles in the apparatus is increased making it possible to reduce the daily addition of fresh catalyst particles and the daily withdrawal of deactivated catalyst particles while retaining an adequate volume of particles in the system.

A third test (test No. 3) was carried out with stripping steam reduced to 1.6 metric tons/hour. The results obtained were also satisfactory relative to those in case No. 1. Thus, stripping according to the present invention makes it possible to reduce stripping steam consumption while improving stripping efficacy compared to that of prior-art means. Moreover, this brings about energy savings and a reduction in volume of contaminated water stemming from the condensation of steam used for stripping.

The results described hereinabove reflect the advantages of the stripping apparatus according to the present invention. In particular, the improved contact between gaseous fluid and catalyst particles results in reduced hydrocarbon entrainment to the regenerator, lower coke hydrogen content and elimination of afterburning.

Having described in detail preferred embodiments of the present invention, it is to be understood that the invention defined by the appended claims is not to be limited by particular details set forth in the above description as many apparent variations thereof are possible without departing from the spirit or scope of the present invention.

We claim:

1. An apparatus for stripping fluidized solid particles countercurrently with a gaseous stripping fluid, comprising:
   (a) an approximately vertical stripping chamber;
   (b) at least one conduit ending at the top of the chamber and used or introducing the particles;
   (c) at least one conduit connected to the bottom of the chamber, for discharging the stripped particles;
   (d) at least one discharge line for the cracked feedstock; and
   (e) at least one line for feeding the gaseous stripping fluid, said line ending at the bottom of the chamber;
   wherein the chamber comprises a zone of downward circulation of the suspended particles countercurrently to said fluid, said apparatus further comprising at least one packing structure comprising at least one packing element whose flow cross-section is essentially transverse to the chamber axis, said packing element extending over the entire cross-section of the chamber in the circulation zone and comprising cells through which is the particles and the stripping fluid, said cells orienting approximately radially the circulation of the fluid and of the particles to be stripped and wherein said packing element comprises cells formed by layers of corrugated sheets.

2. The apparatus according to claim 1, said corrugated sheets being assembled so that the edge of corrugation of each corrugated sheet forms an angle of about 45 to 135 degrees with the edge of corrugation of the adjacent corrugated sheet.

3. The apparatus according to claim 2, wherein the plane of corrugations of a first corrugated sheet is oriented so as to form an angle of about 45 to 90 degrees with the plane of corrugations of the adjacent corrugated sheet.

4. An apparatus for stripping fluidized solid particles countercurrently with a gaseous stripping fluid, comprising:
   (a) a stripping chamber having a stripping zone;
   (b) at least one conduit for introducing the particles into the chamber above said stripping zone;
   (c) at least one conduit for discharging the stripped particles being connected to the chamber below said stripping zone;
   (d) at least one discharge line for the cracked feedstock in the chamber being connected to the chamber above said stripping zone; and
   (e) at least one line for feeding the gaseous stripping fluid into the lower portion of the chamber;
   wherein said stripping zone comprises at least one packing element with upper and lower faces extending over an entire cross-section of the stripping zone and having an array of openings in such faces with such openings each being defined by at least one passage and with such passages each being relatively divergent to adjacent passages and each having a radial component, and said passages having walls sufficient to present multiple obstructions along any axial line through said element whereby countercurrent flows across said element are tortuous and wherein said packing element comprises cells formed by having of corrugated sheets.

5. The apparatus according to claim 4, wherein said apparatus comprises a plurality of said packing elements.

6. The apparatus according to claim 4, wherein the apparatus contains at least two parallel packing elements disposed one above the other.

7. The apparatus according to claim 4, wherein the apparatus contains three parallel packing elements.

8. The apparatus according to claim 4, wherein said passages are thin walled, said openings extend across essentially all the cross-section of said stripping zone, each opening feeds a plurality of passages, and said passages all are interconnected.

9. The apparatus of claim 8 wherein the openings are arranged in an array.

10. The apparatus according to claim 8, wherein each opening has two passages associated therewith shaped and oriented such that about 50% of the stripping fluid issuing from the openings in the upper face of the element, and 50% of the particles issuing from the openings in the lower face of the element, are in a respective first direction and the remaining about 50% of the fluid and of the particles are in a respective second direction, each said second direction forming with its respective first direction an angle of 10 to 90 degrees.

11. The apparatus according to claim 4, wherein the edge of corrugation of each corrugated sheet form an angle of about 45 to 135 degrees with the edge of corrugation of the adjacent corrugated sheet.

12. The apparatus according to claim 11, wherein the corrugated sheets have rounded corrugations.

13. The apparatus according to claim 11, wherein the corrugated sheets have angular flat walled corrugations.

14. The apparatus according to claim 4, wherein the passages are formed by a network of crossed channels of approximately uniform cross-section.

15. The apparatus according to claim 11, wherein about 50% of the particles and of the fluid is deviated from the initial direction inside the elements at each intersection formed by corrugations of a first sheet with corrugations of a second, adjacent sheet, the direction of said deviation forming with the initial direction an angle of about 10 to 90 degrees.

16. The apparatus according to claim 15, wherein the intersections formed by the corrugations of a first sheet with the corrugations of a second, adjacent sheet constitute zones of contact between the particles and the stripping fluid.

17. The apparatus according to claim 11, wherein said angle is about 45 to 90 degrees.

18. The apparatus according to claim 4, wherein the total cumulative thickness E of the packing elements is such that, relative to the height H of the stripping zone, the E/H ratio amounts to 10 to 80%.

19. The apparatus according to claim 4, wherein the space occupied by the packing constitutes about 20 to 80% of the internal volume of the stripping chamber.

20. The apparatus according to claim 4, wherein the packing elements are spaced at a distance from each other to form a space, the space separating them facilitating the redistribution of the particles in the fluid.

21. The apparatus according to claim 4, wherein the volume of the passages of the packing element is from 50 to 98% of the total volume of said element.

22. The apparatus according to claim 4, wherein the volume of the passages of the packing element is from 90 to 98% of the total volume of said element.

23. An apparatus for stripping fluidized solid particles countercurrently with a gaseous stripping fluid, comprising:
   (a) an approximately vertical stripping chamber having a top end, a bottom end, a chamber axis and a chamber cross-section;
   (b) et least one supply conduit ending proximate to the top end of the chamber and suitable for introducing the particles;
   (c) at least one discharge conduit connected proximate to the bottom end of the chamber, suitable for discharging the stripped particles;
   (d) at least one discharge line suitable for discharging cracked feedstock;
   (e) at least one feed line for feeding gaseous stripping fluid, said feed line proximate to the bottom end of the chamber; and
   (f) a downward circulation zone wherein suspended particles flow countercurrently to said fluid inside the chamber,
   wherein said apparatus further comprises at least one packing structure comprising at least one packing element, said packing element having a flow cross-section essentially transverse to the chamber axis and extending over the entire cross-section of the chamber in the circulation zone and comprising a multitude of pathways through which pass the particles and the stripping fluid, said pathways splitting, obstructing and redirecting the particle and fluid flow causing the flow components of the particles and fluid to split and diverge into at least two directions and wherein said packing element comprise cells formed by layers of corrugated sheets.

24. The apparatus according to claim 1, wherein the element comprises cells formed by an assembly of corrugated sheets cut across their plane, said corrugated sheets being assemble so that the edge of corrugation of each corrugated sheet forms an angle of about 45 to 135 degrees with the edge of corrugation of the adjacent corrugated sheet.

* * * * *

UNITED STATES PATENT AND TRADEMARK OFFICE
CERTIFICATE OF CORRECTION

PATENT NO. : 5,716,585
DATED : February 10, 1998
INVENTOR(S) : Senegas et al.

It is certified that error appears in the above-identified patent and that said Letters Patent is hereby corrected as shown below:

In column 1 of the title page under the heading "[30] Foreign Application Priority Data" replace "74 158 56" by --94 15856--.

Signed and Sealed this

Thirtieth Day of June, 1998

Attest:

BRUCE LEHMAN

*Attesting Officer*  *Commissioner of Patents and Trademarks*